United States Patent
Wang

(10) Patent No.: US 10,628,362 B2
(45) Date of Patent: Apr. 21, 2020

(54) STORAGE DEVICE FOR GRAPHIC PROCESSORS AND CONFIGURATION SETTING ADJUSTING METHOD

(71) Applicant: Wiwynn Corporation, New Taipei (TW)

(72) Inventor: Hsien-Yu Wang, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 0 days.

(21) Appl. No.: 16/052,633

(22) Filed: Aug. 2, 2018

(65) Prior Publication Data

US 2019/0324933 A1 Oct. 24, 2019

(30) Foreign Application Priority Data

Apr. 20, 2018 (TW) .............................. 107113613 A

(51) Int. Cl.
*G06F 13/40* (2006.01)
*G06F 13/42* (2006.01)

(52) U.S. Cl.
CPC ...... *G06F 13/4022* (2013.01); *G06F 13/4282* (2013.01); *G06F 2213/0026* (2013.01)

(58) Field of Classification Search
CPC . G06F 13/4022; G06F 3/4282; G06F 13/4282
See application file for complete search history.

(56) References Cited

U.S. PATENT DOCUMENTS

| | | | |
|---|---|---|---|
| 10,325,343 B1 * | 6/2019 | Zhao | H04L 67/42 |
| 2011/0273833 A1 * | 11/2011 | Zhang | G06T 1/20 361/679.32 |

(Continued)

FOREIGN PATENT DOCUMENTS

| | | | |
|---|---|---|---|
| CN | 102236628 | 11/2011 | |
| CN | 102253918 | 4/2014 | |
| WO | WO-2016037503 A1 * | 3/2016 | H04L 41/00 |

OTHER PUBLICATIONS

"Office Action of Taiwan Counterpart Application", dated Dec. 28, 2018, p. 1-p. 6.

*Primary Examiner* — Tim T Vo
*Assistant Examiner* — Phong H Dang
(74) *Attorney, Agent, or Firm* — JCIPRNET

(57) ABSTRACT

A storage device for graphic processors and a configuration setting adjusting method are provided. The method includes: obtaining a chassis connection status by a processor according to a first chassis electrically connected to an input/output module; reading a first initial configuration setting in a switching circuit of the first chassis by the processor; obtaining a host connection status by the processor according to at least one first connection interface electrically connected to at least one first host; and determining whether the first initial configuration setting is applicable to the chassis connection status and the host connection status by the processor according to the chassis connection status, the host connection status and a preset rule; if not, adjusting, by the processor, the first initial configuration setting of the first chassis to another configuration setting which is applicable to the chassis connection status and the host connection status.

18 Claims, 8 Drawing Sheets

(56) References Cited

U.S. PATENT DOCUMENTS

2014/0351654 A1* 11/2014 Zhang ................. G06F 11/2221
714/43
2017/0322899 A1* 11/2017 Ni ....................... G06F 12/0246
2018/0276044 A1* 9/2018 Fong .................... G06F 9/5044
2018/0322081 A1* 11/2018 Breakstone ............ G06F 13/28

* cited by examiner

STORAGE DEVICE FOR GRAPHIC PROCESSORS AND CONFIGURATION SETTING ADJUSTING METHOD

CROSS-REFERENCE TO RELATED APPLICATION

This application claims the priority benefit of Taiwan application serial no. 107113613, filed on Apr. 20, 2018. The entirety of the above-mentioned patent application is hereby incorporated by reference herein and made a part of this specification.

BACKGROUND OF THE INVENTION

1. Field of the Invention

The invention relates to a storage device for graphic processors and a configuration setting adjusting method.

2. Description of Related Art

In general, a host can complete computations by simultaneously using multiple graphic processors (Graphic Processing Unit, GPU). Normally, a plurality of chassis (or drawers) having multiple graphic processors may be electrically connected in series or in parallel so one single host can conduct computations using multiple graphic processors. For example, FIG. 1 is a schematic diagram for connecting hosts to chassis having multiple graphic processors. With reference to FIG. 1, generally, each of chassis 50 to 53 may have a plurality of graphic processors. For example, each chassis may include four graphic processors. Hosts 60 to 63 may be electrically connected to connection interfaces 70a to 70d of an input/output module 70, respectively. When each of the chassis 50 to 53 is electrically connected to the input/output module 70, it is usually required to manually set up internal parameters of switching circuits 80a to 80d in the chassis 50 to 53. By doing so, the switching circuits 80a to 80d may adjust an on/off status for connectors in each chassis (e.g., a first connector 90a and a second connector 90b in the chassis 50) according to the set parameters to change a circuit connection status between the chassis 50 to 53 and the input/output module 70 so the chassis 50 to 53 may be electrically connected to the hosts 60 to 63, respectively. However, manually setting up the internal parameters of the switching circuits 80a to 80d in the chassis 50 to 53 often leads to inconvenience in use.

Moreover, in the prior art, one or more switching circuits may also be added to the input/output module 70 (not shown) to dynamically adjust the circuit connection status between the hosts 60 to 63 and the chassis 50 to 53. Nonetheless, adding the switching circuit in the input/output module 70 often increases the complexity of circuitry in the input/output module 70 and causes a bottleneck in terms of data transmission speed. In addition, because the switching circuit disposed in the input/output module 70 (e.g., a PCIe switch) is higher in unit price, the cost may be overly high if multiple switching circuits are disposed in the input/output module 70.

SUMMARY OF THE INVENTION

The invention proposes a storage device for graphic processors and a configuration setting adjusting method, which may be used to prevent inconvenience and mistakes in manual operation and reduce the cost for disposing circuits in the input/output module.

The invention provides a storage device for graphic processors, and the storage device includes: at least one chassis, each of the at least one chassis including a first connector, a second connector, a switching circuit and at least one graphic processor, the switching circuit being electrically connected to the first connector, the second connector and the at least one graphic processor; and an input/output module, including a processor, at least one connection interface and a storage circuit, the storage circuit stores a plurality of configuration settings. The processor obtains a chassis connection status according to at least one first chassis electrically connected to the input/output module among the at least one chassis. The processor reads a first initial configuration setting in the switching circuit of the first chassis. The processor obtains a host connection status according to a first connection interface electrically connected to a first host among the at least one connection interface. The processor determines whether the first initial configuration setting of the first chassis is applicable to the chassis connection status and the host connection status according to the chassis connection status, the host connection status and a preset rule. When the processor determines that the first initial configuration setting of the first chassis is not applicable to the chassis connection status and the host connection status, the processor changes the first initial configuration setting of the first chassis to one of the configuration settings which is applicable to the chassis connection status and the host connection status.

In an embodiment of the invention, when the processor determines that the first initial configuration setting is applicable to the chassis connection status and the host connection status, the processor powers up the storage device for graphic processors.

In an embodiment of the invention, in the operation where the processor changes the first initial configuration setting of the first chassis to said one of the configuration settings which is applicable to the chassis connection status and the host connection status, the processor changes the first initial configuration setting in the switching circuit of the first chassis to a first configuration setting or a second configuration setting among the configuration settings according to the preset rule such that the switching circuit of the first chassis electrically connects the first chassis to the first host through the first connection interface according to the first configuration setting or the second configuration setting.

In an embodiment of the invention, when the processor changes the first initial configuration setting in the switching circuit of the first chassis to the first configuration setting according to the preset rule, the switching circuit of the first chassis turns on the first connector of the first chassis according to the first configuration setting such that the first chassis is electrically connected to the first connection interface through the first connector of the first chassis, and the switching circuit of the first chassis turns on the second connector of the first chassis according to the first configuration setting.

In an embodiment of the invention, when a second chassis among the at least one chassis is electrically connected to the input/output module and the second chassis is located on one side adjacent to the second connector of the first chassis, the first chassis is electrically connected to the first connector of the second chassis through the second connector of the first chassis.

In an embodiment of the invention, when the processor changes the first initial configuration setting in the switching circuit of the first chassis to the second configuration setting according to the preset rule, the switching circuit of the first chassis turns on the second connector of the first chassis according to the second configuration setting such that the first chassis is electrically connected to the first connection interface through the second connector of the first chassis, and the switching circuit of the first chassis turns off the first connector of the first chassis according to the second configuration setting.

In an embodiment of the invention, when the preset rule is a first preset rule, the processor changes a second initial configuration setting in the switching circuit of the second chassis to a third configuration setting according to the first preset rule, the switching circuit of the second chassis turns on the first connector of the second chassis according to the third configuration setting such that the second chassis is electrically connected to the second connector of the first chassis through the first connector of the second chassis, and the switching circuit of the second chassis turns on the second connector of the second chassis according to the third configuration setting.

In an embodiment of the invention, when a second connection interface among the at least one connection interface is electrically connected to a second host and the preset rule is a second preset rule, the processor changes a second initial configuration setting in the switching circuit of the second chassis to the second configuration setting according to the second preset rule, the switching circuit of the second chassis turns on the second connector of the second chassis according to the second configuration setting such that the second chassis is electrically connected to the second connection interface through the second connector of the second chassis, and the switching circuit of the second chassis turns off the first connector of the second chassis according to the second configuration setting.

In an embodiment of the invention, the switching circuit is a PCIe (Peripheral Component Interconnect Express) switching circuit.

The invention provides a configuration setting adjusting method, which is adapted to a storage device for graphic processors. The storage device includes at least one chassis and an input/output module. Each of the at least one chassis includes a first connector, a second connector a switching circuit and at least one graphic processor. The switching circuit is electrically connected to the first connector, the second connector and the at least one graphic processor. The input/output module includes a processor, at least one connection interface and a storage circuit. The storage circuit stores a plurality of configuration settings. The method includes: obtaining a chassis connection status by the processor according to at least one first chassis electrically connected to the input/output module among the at least one chassis; reading a first initial configuration setting in the switching circuit of the first chassis by the processor; obtaining a host connection status by the processor according to a first connection interface electrically connected to a first host among the at least one connection interface; determining whether the first initial configuration setting of the first chassis is applicable to the chassis connection status and the host connection status by the processor according to the chassis connection status, the host connection status and a preset rule; and when the processor determines that the first initial configuration setting of the first chassis is not applicable to the chassis connection status and the host connection status, adjusting, by the processor, the first initial configuration setting of the first chassis to one of the configuration settings which is applicable to the chassis connection status and the host connection status.

In an embodiment of the invention, the method further includes: when the processor determines that the first initial configuration setting is applicable to the chassis connection status and the host connection status, powering up the storage device for graphic processors by the processor.

In an embodiment of the invention, the step of adjusting, by the processor, the first initial configuration setting of the first chassis to said one of the configuration settings which is applicable to the chassis connection status and the host connection status includes: adjusting the first initial configuration setting in the switching circuit of the first chassis to a first configuration setting or a second configuration setting among the configuration settings by the processor according to the preset rule such that the switching circuit of the first chassis electrically connects the first chassis to the first host through the first connection interface according to the first configuration setting or the second configuration setting.

In an embodiment of the invention, the method further includes: when the processor changes the first initial configuration setting in the switching circuit of the first chassis to the first configuration setting according to the preset rule, turning on the first connector of the first chassis by the switching circuit of the first chassis according to the first configuration setting such that the first chassis is electrically connected to the first connection interface through the first connector of the first chassis; and turning on the second connector of the first chassis by the switching circuit of the first chassis according to the first configuration setting.

In an embodiment of the invention, when a second chassis among the at least one chassis is electrically connected to the input/output module and the second chassis is located on one side adjacent to the second connector of the first chassis, the first chassis is electrically connected to the first connector of the second chassis through the second connector of the first chassis.

In an embodiment of the invention, when the processor changes the first initial configuration setting in the switching circuit of the first chassis to the second configuration setting according to the preset rule, the second connector of the first chassis is turned on by the switching circuit of the first chassis according to the second configuration setting such that the first chassis is electrically connected to the first connection interface through the second connector of the first chassis; and the first connector of the first chassis is turned off by the switching circuit of the first chassis according to the second configuration setting.

In an embodiment of the invention, when the preset rule is a first preset rule, a second initial configuration setting in the switching circuit of the second chassis is adjusted to a third configuration setting by the processor according to the first preset rule, and the first connector of the second chassis is turned on by the switching circuit of the second chassis according to the third configuration setting such that the second chassis is electrically connected to the second connector of the first chassis through the first connector of the second chassis; and the second connector of the second chassis is turned on by the switching circuit of the second chassis according to the third configuration setting.

In an embodiment of the invention, when a second connection interface among the at least one connection interface is electrically connected to a second host and the preset rule is a second preset rule, a second initial configuration setting in the switching circuit of the second chassis is adjusted to the second configuration setting by the processor according to the second preset rule, and the second connector of the second chassis is turned on by the switching circuit of the second chassis according to the second configuration setting such that the second chassis is electrically connected to the second connection interface through the second connector of the second chassis; and the first connector of the second chassis is turned off by the switching circuit of the second chassis according to the second configuration setting.

In an embodiment of the invention, the switching circuit is a PCIe (Peripheral Component Interconnect Express) switching circuit.

Based on the above, the storage device for graphic processors and the configuration setting adjusting method in the invention can automatically determine whether the initial configuration setting of the switching circuit in the chassis is applicable to the host connection status and the chassis connection status of the host before the storage device for the graphic processors is powered up. Further, when the initial configuration setting is not applicable to the host connection status and the chassis connection status, the processor of the input/output module may select the corresponding configuration setting to adjust the switching circuit so as satisfy the host connection status and chassis connection status. In this way, not only can inconvenience and mistakes in manual operation be prevented, the cost for disposing circuits in the input/output module may also be reduced.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
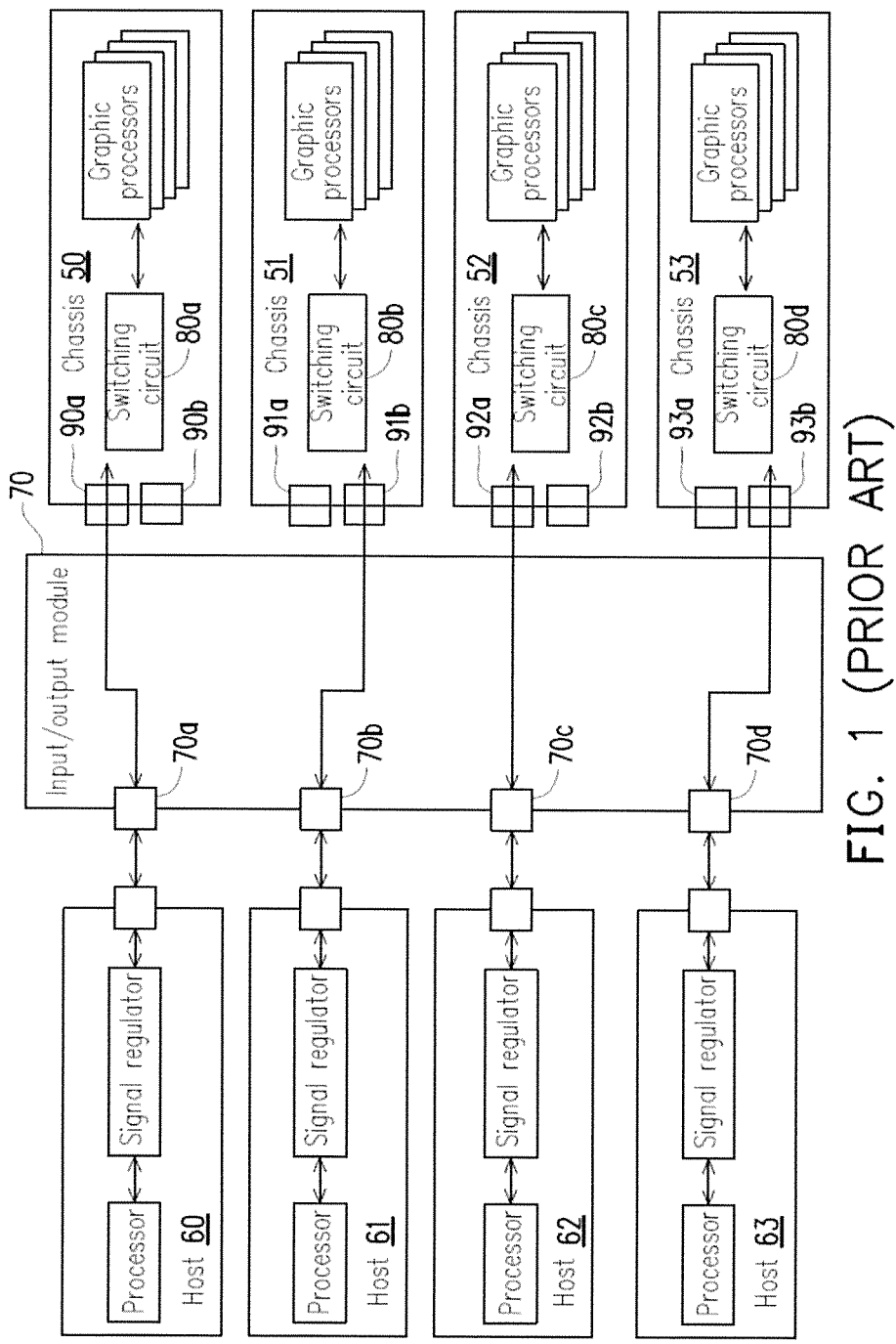
FIG. 1 is a schematic diagram for connecting hosts to chassis having multiple graphic processors.

Reference will now be made in detail to the present preferred embodiments of the invention, examples of which are illustrated in the accompanying drawings. Wherever possible, the same reference numbers are used in the drawings and the description to refer to the same or like parts.

Descriptions of the invention are given with reference to the exemplary embodiments illustrated with accompanied drawings, in which same or similar parts are denoted with same reference numerals. In addition, whenever possible, identical or similar reference numbers stand for identical or similar elements in the figures and the embodiments.

Figure 2:
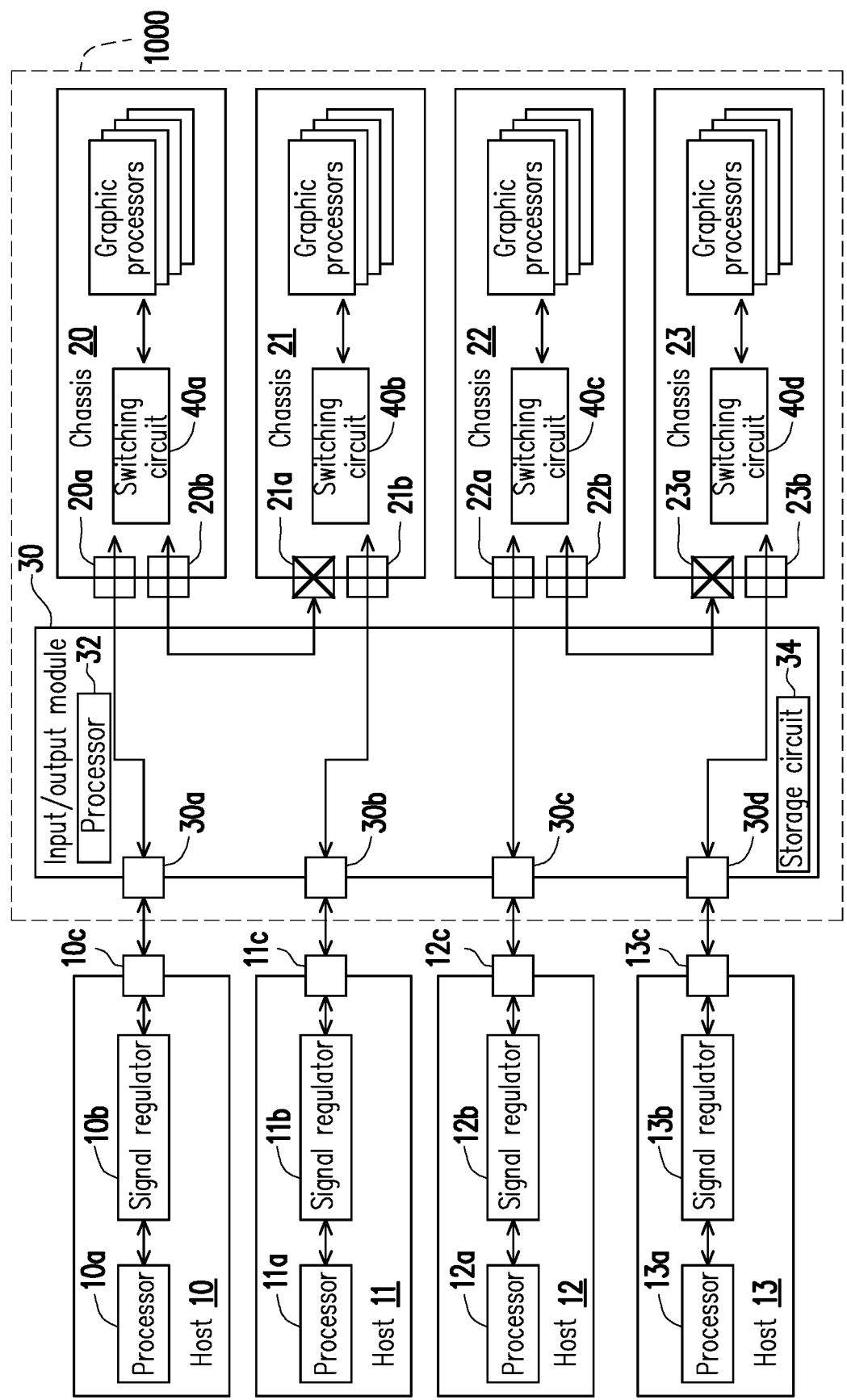
FIG. 2 is a schematic diagram illustrating a storage device for graphic processors according to an embodiment of the invention.

FIG. 2 is a schematic diagram illustrating a storage device for graphic processors according to an embodiment of the invention.

With reference to FIG. 2, a storage device 1000 for graphic processor includes an input/output module 30 and chassis 20 to 23. Each of the chassis 20 to 23 may be electrically connected to the input/output module 30. It should be noted that, the invention is not used to limit the number of the chassis electrically connected to the input/output module 30. In an embodiment, there may be more or less chassis electrically connected to the input/output module 30.

The input/output module 30 may include a processor 32, connection interfaces 30a to 30d and a storage circuit 34. The processor 32 may be a central processing unit (CPU) or other programmable devices for general purpose or special purpose such as a microprocessor and a digital signal processor (DSP), a programmable controller, an application specific integrated circuit (ASIC) or other similar elements or a combination of above-mentioned elements.

The connection interfaces 30a to 30d may be connection interfaces for connecting with Mini-SAS HD signal cables or signal cables of other types. The hosts 10 to 13 may be electrically connected to the connection interfaces 30a to 30d respectively by using Mini-SAS HD signal cables, and the connection interfaces 30a to 30d may be conduct a data transmission with the chassis 20 to 23 through circuits of Peripheral Component Interconnect Express (PCIe) standard or circuits of other standards. It should be noted that, in other embodiments, the input/output module 30 may include more or less connection interfaces.

The storage circuit 34 is, for example, a fixed or a movable device in any possible forms including a random access memory (RAM), a read-only memory (ROM), a flash memory or other similar devices, or a combination of the above-mentioned devices. The storage circuit 34 stores a plurality of configuration settings. In an embodiment, three configuration settings, including a first configuration setting, a second configuration setting and a third configuration setting, are stored by the storage circuit 34. Those configuration settings are used for allowing the processor 32 to set up a switching circuit in each chassis. In particular, the invention is not used to limit the number of the configuration settings stored in the storage circuit 34 of the input/output module 30.

Each chassis among the chassis 20 to 23 includes a first connector, a second connector, a switching circuit and at least one graphic processor. Taking the chassis 20 as an example, the chassis 20 includes a first connector 20a, a second connector 20b, a switching circuit 40a and at least one graphic processor. The switching circuit 40a may be electrically connected to the graphic processor for the data transmission. In an embodiment, the switching circuit 40a is a switching circuit compatible with PCIe standard. Further, the first connector 20a and the second connector 20b may be connectors compatible with PCIe standard. Since each of the chassis 21 to 23 has a similar structure with the chassis 20, and description regarding the same is not repeated hereinafter.

Further, each host among the hosts 10 to 13 may include a processor, a signal regulator and an input/output interface. Taking the host 10 as an example, the host 10 includes a processor 10a, a signal regulator 10b and an input/output interface 10c. The input/output interface 10c is, for example, an interface for connecting with Mini-SAS HD signal cables or signal cables of other types. The signal regulator 10b is used to amplify (or enhance) signals. The processor 10a may be a central processing unit (CPU) or other programmable devices for general purpose or special purpose such as a microprocessor and a digital signal processor (DSP), a programmable controller, an application specific integrated circuit (ASIC) or other similar elements or a combination of above-mentioned elements.

Particularly, in an embodiment, the input/output module 30 is already disposed with related circuits, and the switching circuits 40a to 40d may adjust a circuit on/off status between the chassis 20 to 23 and the input/output module 30 according to the respective configuration settings being set. How to set up the switching circuits 40a to 40d according to the configuration settings in order to adjust the circuit on/off status between the chassis 20 to 23 and the input/output module 30 belongs to a well-known technique in the art, and thus related description is omitted herein.

In an embodiment, before powering up the storage device 1000 for graphic processors, the processor 32 of the input/output module 30 obtains a chassis connection status according to a first chassis electrically connected to the input/output module 30 among the chassis 20 to 23. In other words, the chassis connection status indicates which of the chassis 20 to 23 are currently connected to the input/output module 30, and the processor 32 of the input/output module 30 can self-determine and obtain the chassis connection status. Herein, it should be noted that, the first chassis may refer to one of, a plurality of, or all of the chassis 20 to 23.

Further, the processor 32 of the input/output module 30 reads a first initial configuration setting in the switching circuit of the first chassis. In other words, before powering up the storage device 1000 for graphic processors, the processor 32 of the input/output module 30 reads the configuration setting in the switching circuit in the chassis electrically connected to the input/output module 30.

Further, the processor 32 may also obtain a host connection status according to the connection interface electrically connected to the host among the connection interfaces 30a to 30d. In other words, the host connection status is used to indicate which of the connection interfaces among the connection interfaces 30a to 30d are already electrically connected to the host.

Afterwards, the processor 32 of the input/output module 30 determines whether the first initial configuration setting in the switching circuit of the first chassis electrically connected to the input/output module 30 among the chassis 20 to 23 is applicable to the chassis connection status and the host connection status according to the chassis connection status, the host connection status and a preset rule. When the processor 32 of the input/output module 30 determines that the first initial configuration setting of the first chassis is applicable to the chassis connection status and the host connection status, the processor 32 of the input/output module 30 powers up the storage device 1000 for graphic processors.

However, when the processor 32 of the input/output module 30 determines that the first initial configuration setting of the first chassis is not applicable to the chassis connection status and the host connection status, the processor 32 of the input/output module 30 automatically changes the first initial configuration setting of the first chassis to one of the configuration settings (e.g., the first configuration setting, the second configuration setting or the third configuration setting) which is applicable to the chassis connection status and the host connection status. In this way, inconvenience caused by manually setting the internal parameters of the switching circuits 40a to 40d in the chassis 20 to 23 may be prevented.

In an embodiment, when the configuration setting in the switching circuit of one chassis is adjusted to the first configuration setting, the switching circuit of that chassis turns on the first connector belonging to that chassis according to the first configuration setting such that the chassis is electrically connected to the connection interface corresponding to the chassis through the first connector of that chassis. In addition, the switching circuit of the chassis adjusted to use the first configuration setting further turns on the second connector belonging to that chassis according to the first configuration setting.

In an embodiment, when the configuration setting in the switching circuit of one chassis is adjusted to the second configuration setting, the switching circuit of that chassis turns on the second connector belonging to that chassis according to the second configuration setting such that the chassis is electrically connected to the connection interface corresponding to that chassis through the second connector of that chassis. In addition, the switching circuit of the chassis adjusted to use the second configuration setting further turns off the first connector belonging to that chassis according to the second configuration setting.

In an embodiment, when the configuration setting in the switching circuit of one chassis is adjusted to the third configuration setting, the switching circuit of that chassis turns on the first connector belonging to that chassis according to the third configuration setting such that the chassis is electrically connected to the second connector of another adjacent chassis through the first connector of the chassis. In addition, the switching circuit of the chassis adjusted to use the third configuration setting further turns on the second connector belonging to that chassis according to the third configuration setting.

The configuration setting adjusting method of the invention is described below with reference to multiple embodiments.

First Embodiment

Referring back to FIG. 2, in the case of FIG. 2, before powering up the storage device 1000 for graphic processors, the processor 32 of the input/output module 30 determines and obtains a chassis connection status, and the chassis connection status is used to indicate that the chassis 20 to 23 are electrically connected to the input/output module 30. Further, the processor 32 of the input/output module 30 reads configuration settings in the switching circuits 40a to 40d of the chassis 20 to 23. In addition, the processor 32 of the input/output module 30 further determines that the connection interfaces 30a to 30d are already electrically connected to the hosts 10 to 13 respectively. Therefore, the processor 32 of the input/output module 30 may obtain a host connection status indicating that the connection interfaces 30a to 30d are already connected to the hosts 10 to 13 respectively.

Afterwards, when the processor 32 of the input/output module 30 determines that the configuration settings in the switching circuits 40a to 40d of the chassis 20 to 23 are not applicable to the chassis connection status and the host connection status, the processor 32 of the input/output module 30 changes each of the configuration settings in the switching circuits 40a to 40d of the chassis 20 to 23 to the first configuration setting or the second configuration setting according to the preset rule so the switching circuit 40a to 40d of the chassis 20 to 23 can electrically connect the chassis 20 to 23 to the hosts 10 to 13 respectively through the connection interfaces 30a to 30d according to the first configuration setting or the second configuration setting.

It should be noted that, the preset rule may include a first preset rule and a second preset rule. Among them, the first preset rule aims to allow one host to simultaneously use as many graphic processors in multiple chassis as possible. The second preset rule aims allow one host to use only the graphic processors in one single chassis. In other words, the first preset rule may allow one host to obtain and use more graphic processors, whereas the second preset rule allows each of the hosts to obtain and use the same number of the graphic processors evenly. Whether the processor 32 uses the first preset rule or the second preset rule in determination may be automatically adjusted by the input/output circuit 30 or may be adjusted manually.

In an embodiment, it is assumed that the processor 32 uses the first preset rule in determination. For instance, when the processor 32 of the input/output module 30 determines that the configuration settings in the switching circuits 40a to 40d of the chassis 20 to 23 do not meet the first preset rule (e.g., when one host can only use the graphic processors in one chassis according to the configuration settings), the processor 32 of the input/output module 30 may determine that the configuration settings in the switching circuits 40a to 40d of the chassis 20 to 23 are not applicable to the chassis connection status and the host connection status.

In an embodiment, it is assumed that the processor 32 uses the second preset rule in determination. For instance, when the processor 32 of the input/output module 30 determines that the configuration settings in the switching circuits 40a to 40d of the chassis 20 to 23 do not meet the second preset rule (e.g., when one host can use the graphic processors from multiple chassis according to the configuration settings), the processor 32 of the input/output module 30 may determine that the configuration settings in the switching circuits 40a to 40d of the chassis 20 to 23 are not applicable to the chassis connection status and the host connection status.

In this embodiment, due to a circuit disposition relationship in the input/output module 30, it is assumed that in the case of the second preset rule, the configuration settings in the switching circuit 40a of the chassis 20 and the switching circuit 40c of the chassis 22 are set as the first configuration setting by the processor 32; and the configuration settings in the switching circuit 40b of the chassis 21 and the switching circuit 40d of the chassis 23 are set as the second configuration setting.

Taking the chassis 20 as an example, when the processor 32 of the input/output module 30 changes an initial configuration setting in the switching circuit 40a of the chassis 20 to the first configuration setting according to the preset rule, the switching circuit 40a of the chassis 20 turns on the first connector 20a of the chassis 20 according to the first configuration setting such that the chassis 20 is electrically connected to the connection interface 30a through the first connector 20a. In addition, the switching circuit 40a of the chassis 20 turns on the second connector 20b of the chassis 22 according to the first configuration setting. A connection relationship between the chassis 22 and the host 12 is similar to a connection relationship between the chassis 20 and the host 10, which is not repeatedly described hereinafter.

Further, taking the chassis 21 adjacent to the chassis 20 as an example, when the processor 32 of the input/output module 30 changes the configuration setting (also referred to as the initial configuration setting) in the switching circuit 40b of the chassis 21 to the second configuration setting according to the preset rule, the switching circuit 40b of the chassis 21 turns on the second connector 21b of the chassis 21 according to the second configuration setting such that the chassis 21 is electrically connected to the connection interface 30b through the second connector 21b. In addition, the switching circuit 40b of the chassis 21 turns off the first connector 21a of the chassis 21 according to the second configuration setting. A connection relationship between the chassis 23 and the host 13 is similar to a connection relationship between the chassis 21 and the host 11, which is not repeatedly described hereinafter.

It should be noted that, the chassis 21 is located on one side adjacent to the second connector 20b of the chassis 20 and the chassis 20 turns on the second connector 20b according to the first configuration setting. However, because the first connector 21a of the chassis 21 is in a turned-off status, the second connector 20b of the chassis 20 cannot be electrically connected to the first connector 21a of the chassis 21. A similar situation also occurs between the second connector 22b of the chassis 22 and the first connector 23a of the chassis 23.

After going through the above settings, the processor 32 of the input/output module 30 determines whether the configuration settings in the switching circuits of the chassis electrically connected to the input/output module 30 among the chassis 20 to 23 are applicable to the chassis connection status and the host connection status once again according to the chassis connection status, the host connection status and the preset rule (e.g., the second preset rule). When the processor 32 of the input/output module 30 determines that the configuration setting of the current chassis is applicable to the chassis connection status and the host connection status, the processor 32 of the input/output module 30 powers up the storage device 1000 for graphic processors.

Second Embodiment

Figure 3:
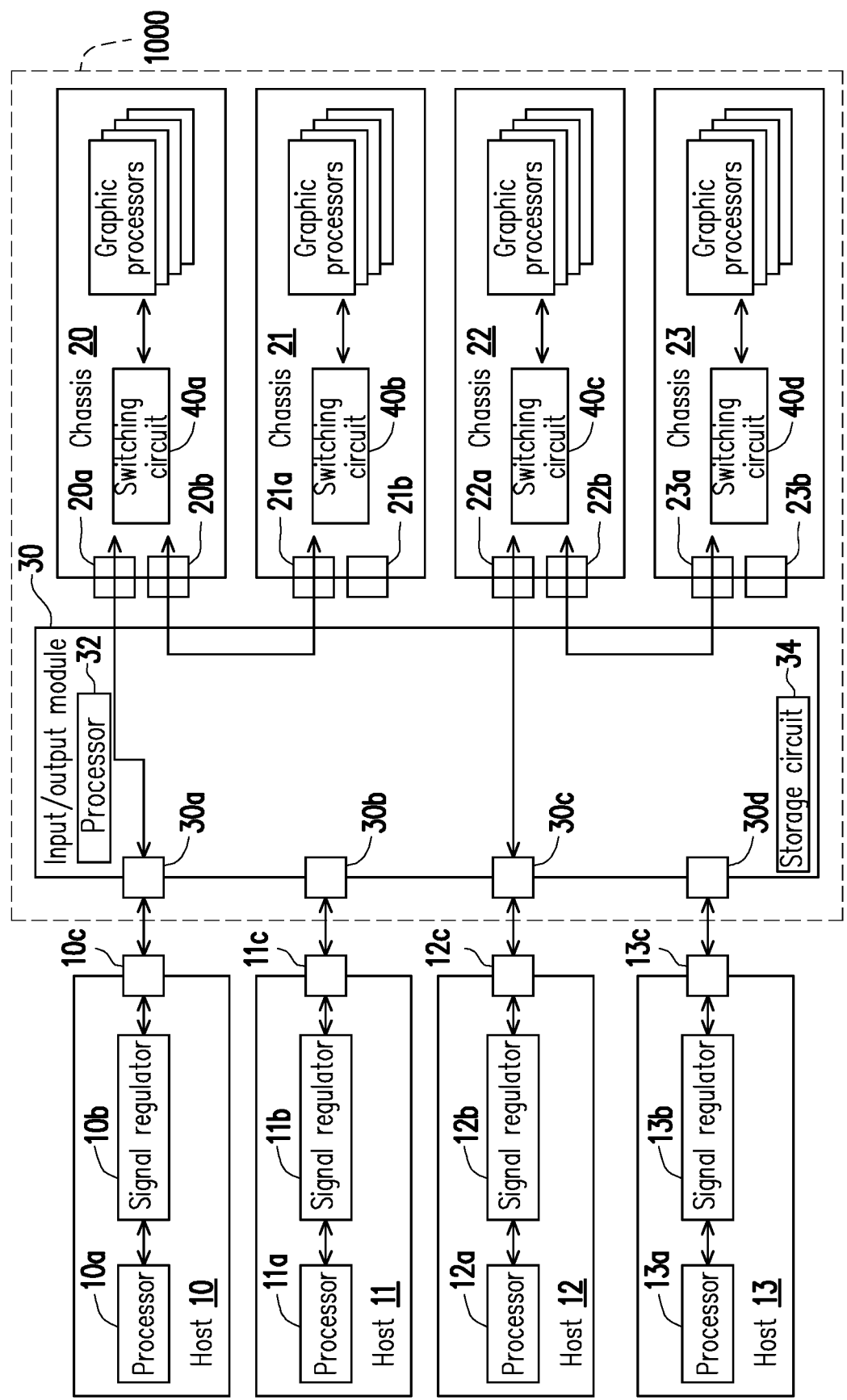
FIG. 3 is a schematic diagram illustrating a storage device for graphic processors according to a second embodiment of the invention.

FIG. 3 is a schematic diagram illustrating a storage device for graphic processors according to a second embodiment of the invention.

Referring to FIG. 3, in the case of FIG. 3, before powering up the storage device 1000 for graphic processors, the processor 32 of the input/output module 30 determines and obtains a chassis connection status, and the chassis connection status is used to indicate that the chassis 20 to 23 are electrically connected to the input/output module 30. Further, the processor 32 of the input/output module 30 reads configuration settings in the switching circuits 40a to 40d of the chassis 20 to 23. In addition, the processor 32 of the input/output module 30 further determines that the connection interfaces 30a to 30d are already connected to the hosts 10 to 13 respectively. Therefore, the processor 32 of the input/output module 30 may obtain a host connection status indicating that the connection interfaces 30a to 30d are already connected to the hosts 10 to 13 respectively.

In this embodiment, when the processor 32 of the input/output module 30 determines that the configuration settings in the switching circuits 40a to 40d of the chassis 20 to 23 are not applicable to the chassis connection status and the host connection status, it is assumed that the processor 32 of the input/output module 30 would adjust each of the configuration settings in the switching circuits 40a to 40d of the chassis 20 to 23 according to the first reset rule. Herein, the first preset rule aims to allow one host to simultaneously use the graphic processors in multiple chassis. For example, it is assumed that the processor 32 uses the first preset rule in determination. When the processor 32 of the input/output module 30 determines that the configuration settings in the switching circuits 40a to 40d of the chassis 20 to 23 do not meet the first preset rule (e.g., when one host can only use the graphic processors in one chassis according to the configuration settings), the processor 32 of the input/output module 30 may determine that the configuration settings in the switching circuits 40a to 40d of the chassis 20 to 23 are not applicable to the chassis connection status and the host connection status.

As similar to the example of FIG. 2, in this embodiment, due to a circuit disposition relationship in the input/output module 30, in the case of the first preset rule, the configuration settings in the switching circuit 40a of the chassis 20 and the switching circuit 40c of the chassis 22 are set as the first configuration setting by the processor 32. The difference is that the configuration settings in the switching circuit 40b of the chassis 21 and the switching circuit 40d of the chassis 23 would be set as the third configuration setting.

Taking the chassis 20 as an example, when the processor 32 of the input/output module 30 changes the configuration setting (or known as the initial configuration setting) in the switching circuit 40a of the chassis 20 to the first configuration setting according to the preset rule, the switching circuit 40a of the chassis 20 turns on the first connector 20a of the chassis 20 according to the first configuration setting such that the chassis 20 is electrically connected to the connection interface 30a through the first connector 20a. In addition, the switching circuit 40a of the chassis 20 turns on the second connector 20b of the chassis 20 according to the first configuration setting. A connection relationship between the chassis 22 and the host 12 is similar to a connection relationship between the chassis 20 and the host 10, which is not repeatedly described hereinafter.

Further, taking the chassis 21 adjacent to the chassis 20 as an example, when the processor 32 of the input/output module 30 changes the configuration setting (also referred to as an initial configuration setting) in the switching circuit 40b of the chassis 21 to the third configuration setting according to the preset rule, the switching circuit 40b of the chassis 21 turns on the first connector 21a of the chassis 21 according to the third configuration setting such that the chassis 21 is electrically connected to the second connector 20b of the chassis 20 through the first connector 21a. In addition, the switching circuit 40b of the chassis 21 further turns on the second connector 21b of the chassis 21 according to the third configuration setting. It should be noted that, due to a circuit disposition relationship in the input/output nodule 30, the second connector 21b of the chassis 21 would not be electrically connected to the first connector 22a of the chassis 22.

It should be noted that, the chassis 21 is located on one side adjacent to the second connector 20b of the chassis 20 and the chassis 20 turns on the second connector 20b according to the first configuration setting. Because the first connector 21a of the chassis 21 is in a turned-on status, with such circuit disposition relationship of the input/output module 30, the second connector 20b of the chassis 20 would be electrically connected to the first connector 21a of the chassis 21. In this case, the host 10 may simultaneously use the graphic processors in the chassis 20 and the chassis 21. A similar situation also occurs between the second connector 22b of the chassis 22 and the first connector 23a of the chassis 23. Therefore, the host 12 may simultaneously use the graphic processors in the chassis 22 and the chassis 23.

After going through the above settings, the processor 32 of the input/output module 30 then determines whether the configuration settings in the switching circuits of the chassis electrically connected to the input/output module 30 among the chassis 20 to 23 are applicable to the chassis connection status and the host connection status once again according to the chassis connection status, the host connection status and the preset rule (e.g., the first preset rule). When the processor 32 of the input/output module 30 determines that the configuration setting of the current chassis is applicable to the chassis connection status and the host connection status, the processor 32 of the input/output module 30 powers up the storage device 1000 for graphic processors.

However, it should be noted that, in the embodiment of FIG. 3, the host 10 may also use the graphic processors in the chassis 20 and the chassis 21. Nonetheless, no chassis is assigned to the host 11. Similarly, the host 12 may use the graphic processors in the chassis 22 and the chassis 23. Nonetheless, no chassis is assigned to the host 13.

Third Embodiment

Figure 4:
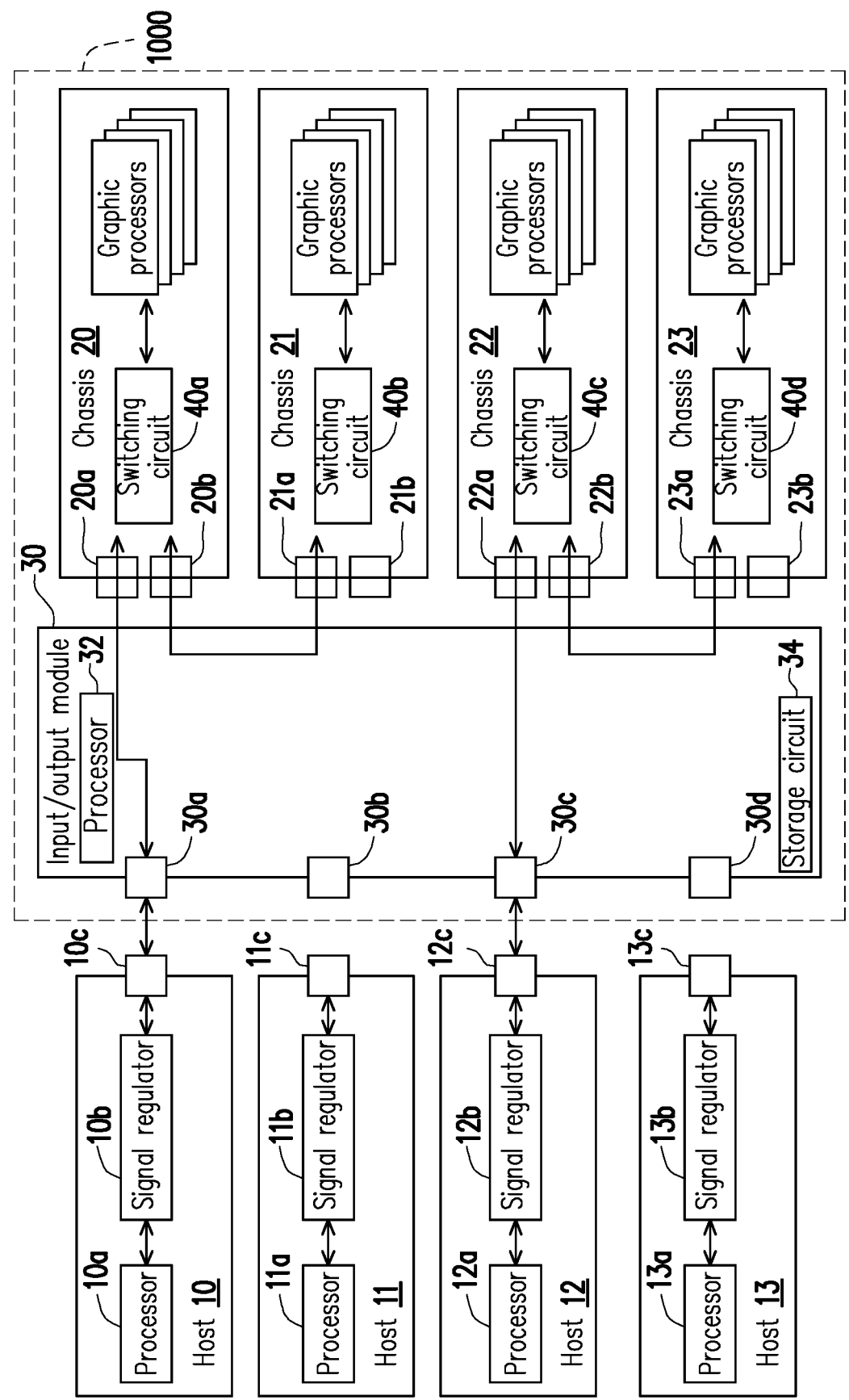
FIG. 4 is a schematic diagram illustrating a storage device for graphic processors according to a third embodiment of the invention.

FIG. 4 is a schematic diagram illustrating a storage device for graphic processors according to a third embodiment of the invention.

Referring to FIG. 4, in the case of FIG. 4, before powering up the storage device 1000 for graphic processors, the processor 32 of the input/output module 30 determines and obtains a chassis connection status, and the chassis connection status is used to indicate that the chassis 20 to 23 are electrically connected to the input/output module 30. Further, the processor 32 of the input/output module 30 reads configuration settings in the switching circuits 40a to 40d of the chassis 20 to 23. In addition, the processor 32 of the input/output module 30 further determines that the connection interface 30a and the connection interface 30c are already connected to the host 10 and the host 12 respectively. Therefore, the processor 32 of the input/output module 30 may obtain a host connection status indicating that the connection interface 30a and the connection interface 30c are already connected to the host 10 and the host 12 respectively.

In this embodiment, when the processor 32 of the input/output module 30 determines that the configuration settings in the switching circuits 40a to 40d of the chassis 20 to 23 are not applicable to the chassis connection status and the host connection status, it is assumed that the processor 32 of the input/output module 30 would adjust each of the configuration settings in the switching circuits 40a to 40d of the chassis 20 to 23 according to the first reset rule. Herein, the first preset rule aims to allow one host to simultaneously use the graphic processors in multiple chassis. When the processor 32 of the input/output module 30 determines that the configuration settings in the switching circuits 40a to 40d of the chassis 20 to 23 do not meet the first preset rule (e.g., when one host can only use the graphic processors in one chassis according to the configuration settings), the processor 32 of the input/output module 30 may determine that the configuration settings in the switching circuits 40a to 40d of the chassis 20 to 23 are not applicable to the chassis connection status and the host connection status.

In this embodiment, due to a circuit disposition relationship in the input/output module 30, in the case of the first preset rule, the configuration settings in the switching circuit 40a of the chassis 20 and the switching circuit 40c of the chassis 22 are set as the first configuration setting by the processor 32. The configuration settings in the switching circuit 40b of the chassis 21 and the switching circuit 40d of the chassis 23 are set as the third configuration setting. Adjustment of the on/off status of the first connector and the second connector in the chassis according to the first configuration setting or the third configuration setting has been described in detail in the second embodiment, which is not repeatedly described hereinafter.

It should be noted that, the chassis 21 is located on one side adjacent to the second connector 20b of the chassis 20 and the chassis 20 turns on the second connector 20b according to the first configuration setting. Because the first connector 21a of the chassis 21 is in a turned-on status, with such circuit disposition relationship of the input/output module 30, the second connector 20b of the chassis 20 would be electrically connected to the first connector 21a of the chassis 21. In this case, the host 10 may simultaneously use the graphic processors in the chassis 20 and the chassis 21. A similar situation also occurs between the second connector 22b of the chassis 22 and the first connector 23a of the chassis 23. Therefore, the host 12 may simultaneously use the graphic processors in the chassis 22 and the chassis 23.

After going through the above settings, the processor 32 of the input/output module 30 then determines whether the configuration settings in the switching circuits of the chassis electrically connected to the input/output module 30 among the chassis 20 to 23 are applicable to the chassis connection status and the host connection status once again according to the chassis connection status, the host connection status and the preset rule (e.g., the first preset rule). When the processor 32 of the input/output module 30 determines that the configuration setting of the current chassis is applicable to the chassis connection status and the host connection status, the processor 32 of the input/output module 30 powers up the storage device 1000 for graphic processors.

Fourth Embodiment

Figure 5:
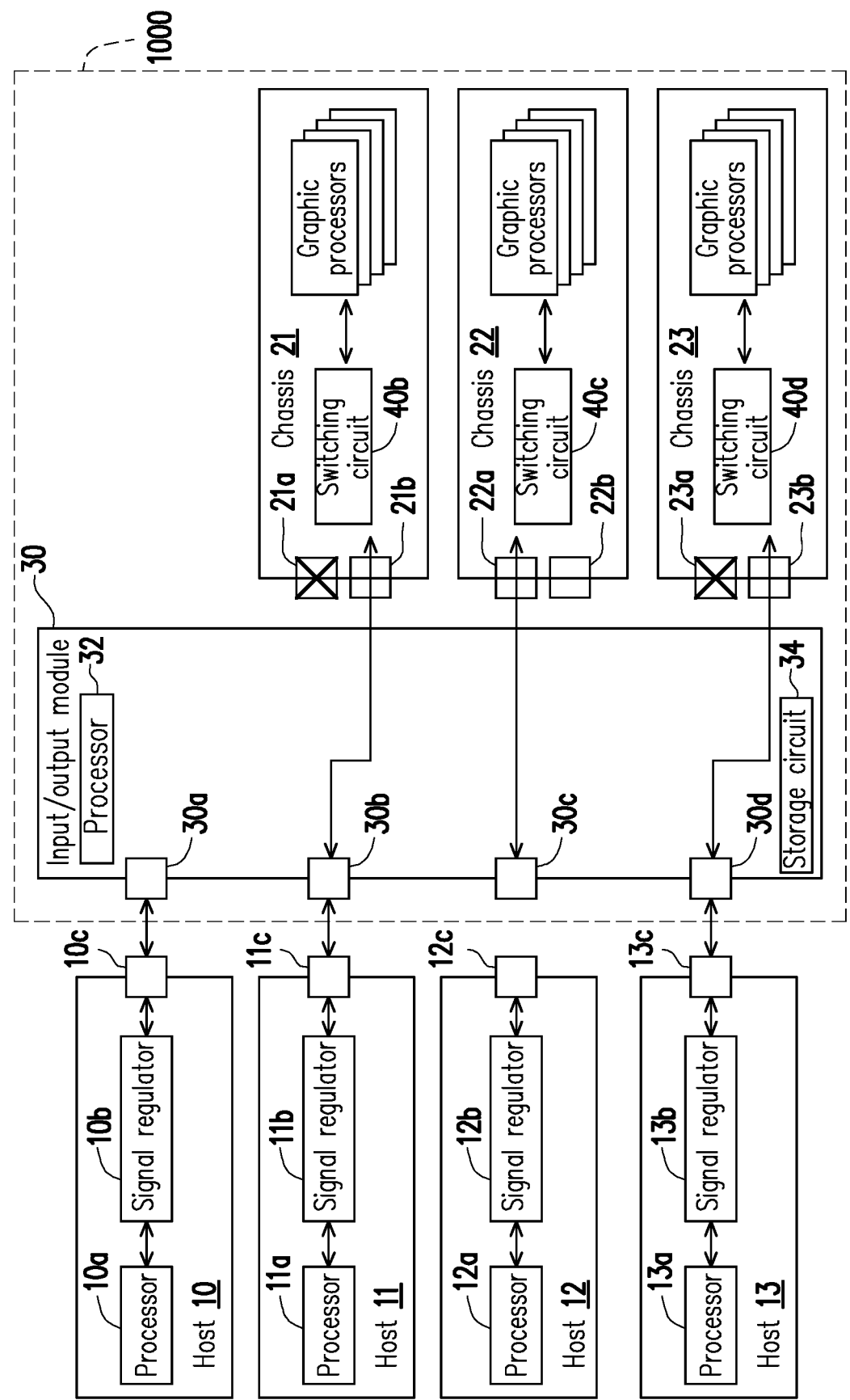
FIG. 5 is a schematic diagram illustrating a storage device for graphic processors according to a fourth embodiment of the invention.

FIG. 5 is a schematic diagram illustrating a storage device for graphic processors according to a fourth embodiment of the invention.

Referring to FIG. 5, in the case of FIG. 5, before powering up the storage device 1000 for graphic processors, the processor 32 of the input/output module 30 determines and obtains a chassis connection status, and the chassis connection status is used to indicate that the chassis 21 to 23 are electrically connected to the input/output module 30. Further, the processor 32 of the input/output module 30 reads configuration settings in the switching circuits 40b to 40d of the chassis 21 to 23. In addition, the processor 32 of the input/output module 30 further determines that the connection interface 30a, the connection interface 30b and the connection interface 30d are already connected to the host 10, the host 11 and the host 13 respectively. Therefore, the processor 32 of the input/output module 30 may obtain a host connection status indicating that the connection interface 30a, the connection interface 30b and the connection interface 30d are already connected to the host 10, the host 11 and the host 13 respectively.

In this embodiment, when the processor 32 of the input/output module 30 determines that the configuration settings in the switching circuits 40b to 40d of the chassis 21 to 23 are not applicable to the chassis connection status and the host connection status, it is assumed that the processor 32 of the input/output module 30 would adjust each of the configuration settings in the switching circuits 40b to 40d of the chassis 21 to 23 according to the second preset rule. In this embodiment, when the processor 32 of the input/output module 30 determines that the configuration settings in the switching circuits 40b to 40d of the chassis 21 to 23 do not meet the second preset rule (e.g., when one host can use the graphic processors from multiple chassis according to the configuration settings), the processor 32 of the input/output module 30 may determine that the configuration settings in the switching circuits 40b to 40d of the chassis 21 to 23 are not applicable to the chassis connection status and the host connection status.

In this embodiment, due to a circuit disposition relationship in the input/output module 30, in the case of the second preset rule, the configuration settings in the switching circuit 40b of the chassis 21 and the switching circuit 40d of the chassis 23 are set as the second configuration setting by the processor 32. Adjustment of the on/off status of the first connector and the second connector in the chassis according to the second configuration setting has been described in detail in the first embodiment, which is not repeatedly described hereinafter.

It should be noted that, since the connection interface 30c corresponding to the chassis 22 is not electrically connected to any host, the configuration setting in the switching circuit 40c of the chassis 22 would not be set.

After going through the above settings, the processor 32 of the input/output module 30 determines whether the configuration settings in the switching circuits of the chassis 21 to 23 are applicable to the chassis connection status and the host connection status once again according to the chassis connection status, the host connection status and the preset rule (e.g., the second preset rule). When the processor 32 of the input/output module 30 determines that the configuration setting of the current chassis is applicable to the chassis connection status and the host connection status, the processor 32 of the input/output module 30 powers up the storage device 1000 for graphic processors.

Fifth Embodiment

Figure 6:
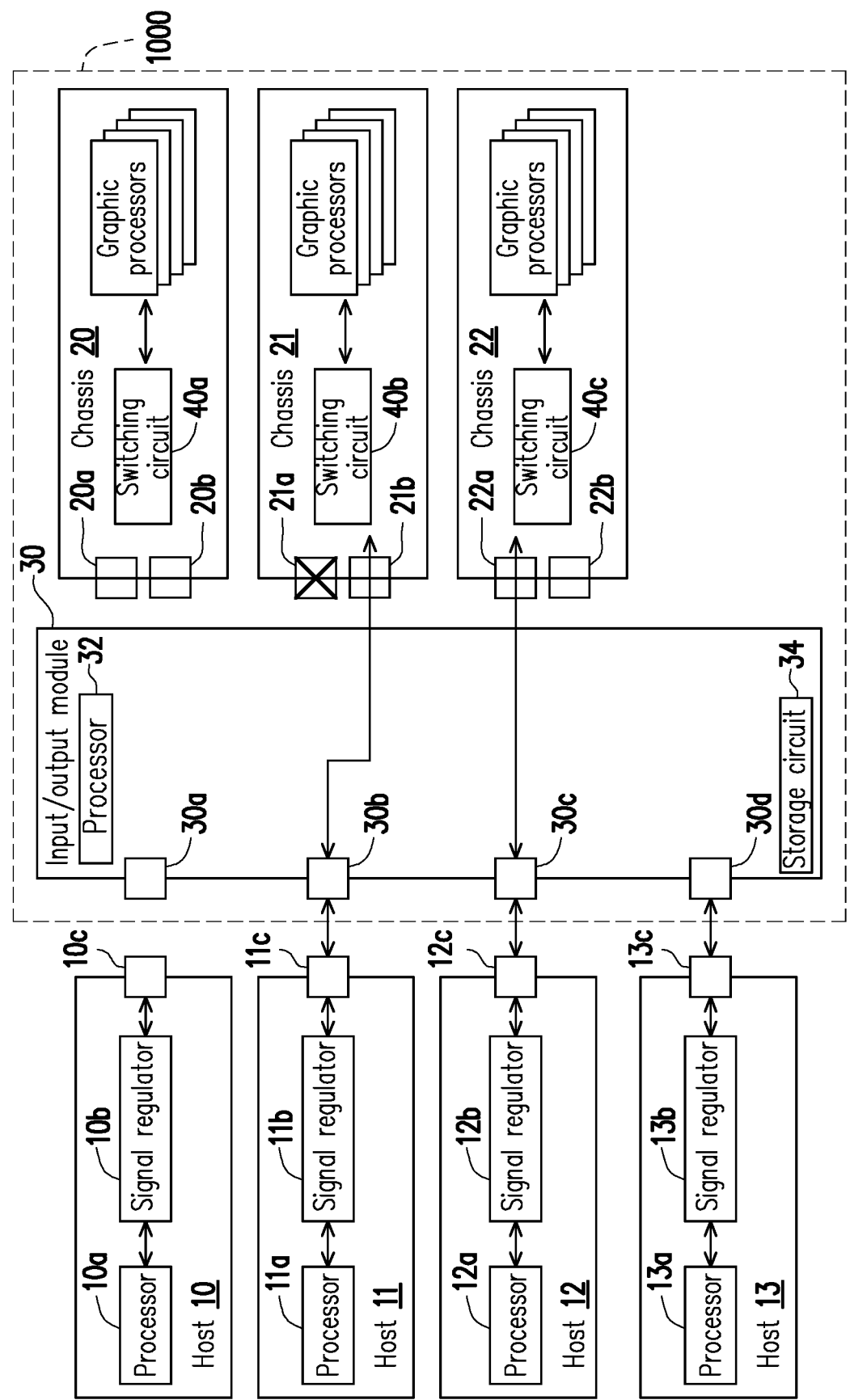
FIG. 6 is a schematic diagram illustrating a storage device for graphic processors according to a fifth embodiment of the invention.

FIG. 6 is a schematic diagram illustrating a storage device for graphic processors according to a fifth embodiment of the invention.

Referring to FIG. 6, in the case of FIG. 6, before powering up the storage device 1000 for graphic processors, the processor 32 of the input/output module 30 determines and obtains a chassis connection status, and the chassis connection status is used to indicate that the chassis 20 to 22 are electrically connected to the input/output module 30. Further, the processor 32 of the input/output module 30 reads configuration settings in the switching circuits 40a to 40c of the chassis 20 to 22. In addition, the processor 32 of the input/output module 30 further determines that the connection interface 30b, the connection interface 30c and the connection interface 30d are already connected to the host 11, the host 12 and the host 13 respectively. Therefore, the processor 32 of the input/output module 30 may obtain a host connection status indicating that the connection interface 30b, the connection interface 30c and the connection interface 30d are already connected to the host 11, the host 12 and the host 13 respectively.

In this embodiment, when the processor 32 of the input/output module 30 determines that the configuration settings in the switching circuits 40a to 40c of the chassis 20 to 22 are not applicable to the chassis connection status and the host connection status, it is assumed that the processor 32 of the input/output module 30 would adjust each of the configuration settings in the switching circuits 40a to 40c of the chassis 20 to 22 according to the second preset rule. In this embodiment, when the processor 32 of the input/output module 30 determines that the configuration settings in the switching circuits 40a to 40c of the chassis 20 to 22 do not meet the second preset rule (e.g., when one host can use the graphic processors from multiple chassis according to the configuration settings), the processor 32 of the input/output module 30 may determine that the configuration settings in the switching circuits 40a to 40c of the chassis 20 to 22 are not applicable to the chassis connection status and the host connection status.

In this embodiment, due to a circuit disposition relationship in the input/output module 30, in the case of the second preset rule, the configuration setting in the switching circuit 40b of the chassis 21 is set as the second configuration setting by the processor 32. The configuration setting in the switching circuit 40c of the chassis 22 is set as the first configuration setting by the processor 32. Adjustment of the on/off status of the first connector and the second connector in the chassis according to the first configuration setting and the second configuration setting has been described in detail in the first embodiment, which is not repeatedly described hereinafter.

It should be noted that, since the connection interface 30a corresponding to the chassis 20 is not electrically connected to any host, the configuration setting in the switching circuit 40a of the chassis 20 would not be set. In addition, although the host 13 is electrically connected to the connection interface 30d of the input/output module 30, the host 13 is unable to use the graphic processors in the chassis because there is no corresponding chassis for the connection interface 30d to be electrically connected to.

After going through the above settings, the processor 32 of the input/output module 30 determines whether the configuration settings in the switching circuits 40a to 40c of the chassis 20 to 22 are applicable to the chassis connection status and the host connection status once again according to the chassis connection status, the host connection status and the preset rule (e.g., the second preset rule). When the processor 32 of the input/output module 30 determines that the configuration setting of the current chassis is applicable to the chassis connection status and the host connection status, the processor 32 of the input/output module 30 powers up the storage device 1000 for graphic processors.

Sixth Embodiment

Figure 7:
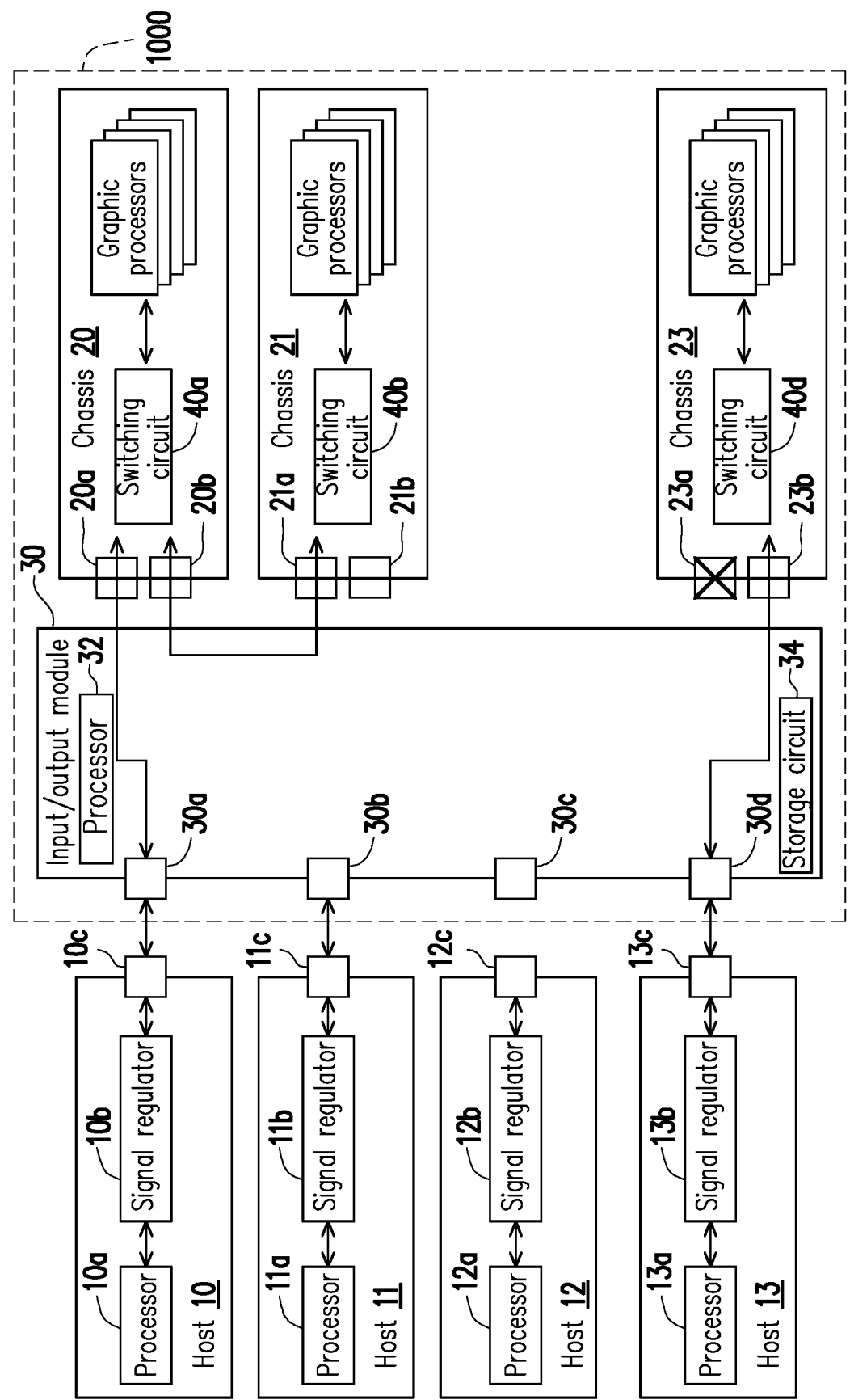
FIG. 7 is a schematic diagram illustrating a storage device for graphic processors according to a sixth embodiment of the invention.

FIG. 7 is a schematic diagram illustrating a storage device for graphic processors according to a sixth embodiment of the invention.

Referring to FIG. 7, in the case of FIG. 7, before powering up the storage device 1000 for graphic processors, the processor 32 of the input/output module 30 determines and obtains a chassis connection status, and the chassis connection status is used to indicate that the chassis 20 to 21 and the chassis 23 are electrically connected to the input/output module 30. Further, the processor 32 of the input/output module 30 reads configuration settings in the switching circuits 40a to 40b and the switching circuit 40d of the chassis 20 to 21 and the chassis 23. In addition, the processor 32 of the input/output module 30 further determines that the connection interface 30a, the connection interface 30b and the connection interface 30d are already connected to the host 10, the host 11 and the host 13 respectively. Therefore, the processor 32 of the input/output module 30 may obtain a host connection status indicating that the connection interface 30a, the connection interface 30b and the connection interface 30d are already connected to the host 10, the host 11 and the host 13 respectively.

In this embodiment, when the processor 32 of the input/output module 30 determines that the configuration settings in the switching circuits 40a to 40b and the switching circuit 40d are not applicable to the chassis connection status and the host connection status, it is assumed that the processor 32 of the input/output module 30 would adjust each of the configuration settings in the switching circuits 40a to 40b and the switching circuit 40d according to the first reset rule. In this embodiment, when the processor 32 of the input/output module 30 determines that the configuration settings in the switching circuits 40a to 40b and the switching circuit 40d of the chassis 20 to 21 and chassis 23 do not meet the first preset rule (e.g., when one host can only use the graphic processors in one chassis according to the configuration settings), the processor 32 of the input/output module 30 may determine that the configuration settings in the switching circuits 40a to 40b and the switching circuit 40d of the chassis 20 to 21 and chassis 23 are not applicable to the chassis connection status and the host connection status.

In this embodiment, due to a circuit disposition relationship in the input/output module 30, in the case of the first preset rule, the configuration setting in the switching circuit 40a of the chassis 20 is set as the first configuration setting by the processor 32. The configuration setting in the switching circuit 40b of the chassis 21 is set as the third configuration setting by the processor 32. The configuration setting in the switching circuit 40d of the chassis 23 is set as the second configuration setting by the processor 32. Adjustment of the on/off status of the first connector and the second connector in the chassis according to the first configuration setting, the second configuration setting and the third configuration setting has been described in detail in the first embodiment and the second embodiment, which are not repeatedly described hereinafter.

It should be noted that, although the host 11 is electrically connected to the connection interface 30b of the input/output module 30, the host 11 is unable to use the graphic processors in the chassis because the chassis 21 corresponding to the connection interface 30b is electrically connected to the chassis 20 already and used by the host 10.

After going through the above settings, the processor 32 of the input/output module 30 determines whether the configuration settings in the switching circuits 40a to 40b and the switching circuit 40c are applicable to the chassis connection status and the host connection status once again according to the chassis connection status, the host connection status and the preset rule (e.g., the first preset rule). When the processor 32 of the input/output module 30 determines that the configuration setting of the current chassis is applicable to the chassis connection status and the host connection status, the processor 32 of the input/output module 30 powers up the storage device 1000 for graphic processors.

Figure 8:
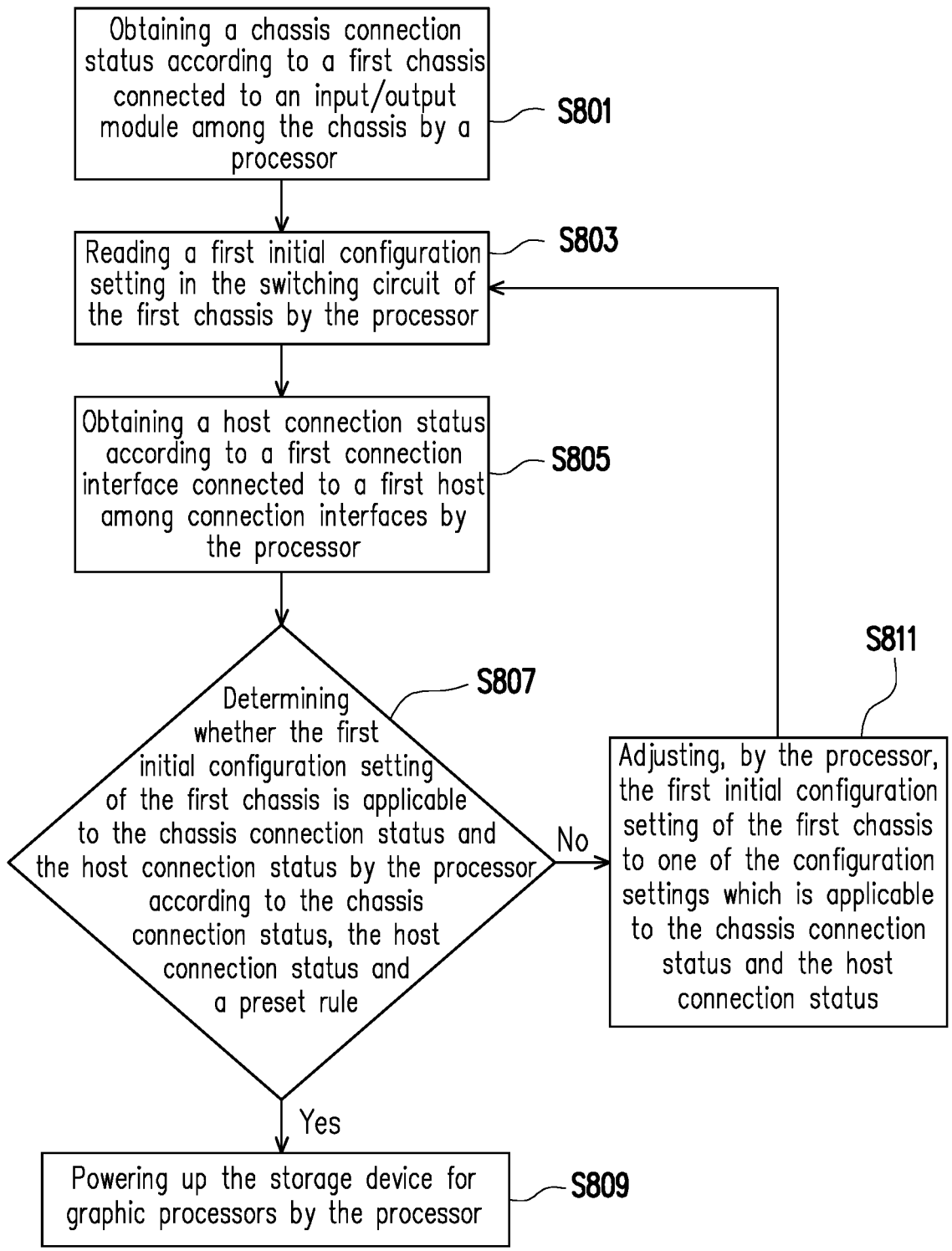
FIG. 8 is a flowchart illustrating a configuration setting adjusting method according to an embodiment of the invention.

FIG. 8 is a flowchart illustrating a configuration setting adjusting method according to an embodiment of the invention.

The following description refers to FIG. 8 and FIG. 2 together. In step S801, the processor 32 obtains a chassis connection status according to at least one first chassis electrically connected to the input/output module 30 among the chassis 20 to 23. In step S803, the processor 32 reads a first initial configuration setting in the switching circuit of the first chassis. In step S805, the processor 32 obtains a host connection status according to a first connection interface electrically connected to a first host among the connection interfaces 30a to 30d, In step S807, the processor 32 determines whether the first initial configuration setting of the first chassis is applicable to the chassis connection status and the host connection status according to the chassis connection status, the host connection status and a preset rule. When the processor 32 determines that the first initial configuration setting of the first chassis is applicable to the chassis connection status and the host connection status, in step S809, the processor 32 powers up the storage device 1000 for graphic processors.

When the processor 32 determines that the first initial configuration setting of the first chassis is not applicable to the chassis connection status and the host connection status, in step S811, the processor 32 changes the first initial configuration setting of the first chassis to one of the configuration settings which is applicable to the chassis connection status and the host connection status, and then re-execute step S803.

It should be noted that, the order of steps in the configuration setting adjusting method of FIG. 8 are not particularly limited by the invention. In other embodiments, step S805 may be executed first before step S801 and step S803 are executed.

In summary, the storage device for graphic processors and the configuration setting adjusting method in the invention can automatically determine whether the initial configuration setting of the switching circuit in the chassis is applicable to the host connection status and the chassis connection status of the host before the storage device for the graphic processors is powered up. Further, when the initial configuration setting is not applicable to the host connection status and the chassis connection status, the processor of the input/output module may select the corresponding configuration setting to adjust the switching circuit so as satisfy the host connection status and chassis connection status. In this way, not only can inconvenience and mistakes in manual operation be prevented, the cost for disposing circuits in the input/output module may also be reduced.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A storage device for graphic processors, the storage device comprising:
   at least one chassis, each of the at least one chassis comprising a first connector, a second connector, a switching circuit and at least one graphic processor, the switching circuit being electrically connected to the first connector, the second connector and the at least one graphic processor; and
   an input/output module, comprising a processor, at least one connection interface and a storage circuit, the storage circuit stores a plurality of configuration settings, wherein
   the processor obtains a chassis connection status according to at least one first chassis electrically connected to the input/output module among the at least one chassis,
   the processor reads a first initial configuration setting in the switching circuit of the at least one first chassis,
   the processor obtains a host connection status according to a first connection interface electrically connected to a first host among the at least one connection interface,
   the processor determines whether the first initial configuration setting of the first chassis is applicable to the chassis connection status and the host connection status according to the chassis connection status, the host connection status and a preset rule, and
   when the processor determines that the first initial configuration setting of the first chassis is not applicable to the chassis connection status and the host connection status, the processor changes the first initial configuration setting of the first chassis to one of the configuration settings which is applicable to the chassis connection status and the host connection status.

2. The storage device for graphic processors according to the claim 1, wherein
   when the processor determines that the first initial configuration setting is applicable to the chassis connection status and the host connection status, the processor powers up the storage device for graphic processors.

3. The storage device for graphic processors according to the claim 1, wherein in the operation where the processor changes the first initial configuration setting of the first chassis to said one of the configuration settings which is applicable to the chassis connection status and the host connection status,
   the processor changes the first initial configuration setting in the switching circuit of the first chassis to a first configuration setting or a second configuration setting among the configuration settings according to the preset rule such that the switching circuit of the first chassis electrically connects the first chassis to the first host through the first connection interface according to the first configuration setting or the second configuration setting.

4. The storage device for graphic processors according to the claim 3, wherein
   when the processor changes the first initial configuration setting in the switching circuit of the first chassis to the first configuration setting according to the preset rule, the switching circuit of the first chassis turns on the first connector of the first chassis according to the first configuration setting such that the first chassis is electrically connected to the first connection interface through the first connector of the first chassis, and
   the switching circuit of the first chassis turns on the second connector of the first chassis according to the first configuration setting.

5. The storage device for graphic processors according to the claim 4, wherein
   when a second chassis among the at least one chassis is electrically connected to the input/output module and the second chassis is located on one side adjacent to the second connector of the first chassis, the first chassis is electrically connected to the first connector of the second chassis through the second connector of the first chassis.

6. The storage device for graphic processors according to the claim 3, wherein
   when the processor changes the first initial configuration setting in the switching circuit of the first chassis to the second configuration setting according to the preset rule, the switching circuit of the first chassis turns on the second connector of the first chassis according to the second configuration setting such that the first chassis is electrically connected to the first connection interface through the second connector of the first chassis, and the switching circuit of the first chassis turns off the first connector of the first chassis according to the second configuration setting.

7. The storage device for graphic processors according to the claim 5, wherein when the preset rule is a first preset rule, the processor changes a second initial configuration setting in the switching circuit of the second chassis to a third configuration setting according to the first preset rule, the switching circuit of the second chassis turns on the first connector of the second chassis according to the third configuration setting such that the second chassis is electrically connected to the second connector of the first chassis through the first connector of the second chassis, and the switching circuit of the second chassis turns on the second connector of the second chassis according to the third configuration setting.

8. The storage device for graphic processors according to the claim 5, wherein when a second connection interface among the at least one connection interface is electrically connected to a second host and the preset rule is a second preset rule, the processor changes a second initial configuration setting in the switching circuit of the second chassis to the second configuration setting according to the second preset rule, the switching circuit of the second chassis turns on the second connector of the second chassis according to the second configuration setting such that the second chassis is electrically connected to the second connection interface through the second connector of the second chassis, and the switching circuit of the second chassis turns off the first connector of the second chassis according to the second configuration setting.

9. The storage device for graphic processors according to the claim 1, wherein the switching circuit is a PCIe (Peripheral Component Interconnect Express) switching circuit.

10. A configuration setting adjusting method, adapted to a storage device for graphic processors, wherein the storage device comprises at least one chassis and an input/output module, each of the at least one chassis comprising a first connector, a second connector, a switching circuit and at least one graphic processor, the switching circuit being electrically connected to the first connector, the second connector and the at least one graphic processor, the input/output module comprising a processor, at least one connection interface and a storage circuit, the storage circuit stores a plurality of configuration settings, the method comprising:

obtaining a chassis connection status by the processor according to at least one first chassis electrically connected to the input/output module among the at least one chassis;

reading a first initial configuration setting in the switching circuit of the first chassis by the processor;

obtaining a host connection status by the processor according to a first connection interface electrically connected to a first host among the at least one connection interface;

determining whether the first initial configuration setting of the first chassis is applicable to the chassis connection status and the host connection status by the processor according to the chassis connection status, the host connection status and a preset rule; and when the processor determines that the first initial configuration setting of the first chassis is not applicable to the chassis connection status and the host connection status, adjusting, by the processor, the first initial configuration setting of the first chassis to one of the configuration settings which is applicable to the chassis connection status and the host connection status.

11. The configuration setting adjusting method according to claim 10, further comprising:

when the processor determines that the first initial configuration setting is applicable to the chassis connection status and the host connection status, powering up the storage device for graphic processors by the processor.

12. The configuration setting adjusting method according to claim 10, wherein the step of adjusting, by the processor, the first initial configuration setting of the first chassis to said one of the configuration settings which is applicable to the chassis connection status and the host connection status comprises:

adjusting the first initial configuration setting in the switching circuit of the first chassis to a first configuration setting or a second configuration setting among the configuration settings by the processor according to the preset rule such that the switching circuit of the first chassis electrically connects the first chassis to the first host through the first connection interface according to the first configuration setting or the second configuration setting.

13. The configuration setting adjusting method according to claim 12, further comprising:

when the processor changes the first initial configuration setting in the switching circuit of the first chassis to the first configuration setting according to the preset rule, turning on the first connector of the first chassis by the switching circuit of the first chassis according to the first configuration setting such that the first chassis is electrically connected to the first connection interface through the first connector of the first chassis; and turning on the second connector of the first chassis by the switching circuit of the first chassis according to the first configuration setting.

14. The configuration setting adjusting method according to claim 13, wherein when a second chassis among the at least one chassis is electrically connected to the input/output module and the second chassis is located on one side adjacent to the second connector of the first chassis, the first chassis is electrically connected to the first connector of the second chassis through the second connector of the first chassis.

15. The configuration setting adjusting method according to claim 12, further comprising:

when the processor changes the first initial configuration setting in the switching circuit of the first chassis to the second configuration setting according to the preset rule, turning on the second connector of the first chassis by the switching circuit of the first chassis according to the second configuration setting such that the first chassis is electrically connected to the first connection interface through the second connector of the first chassis; and turning off the first connector of the first chassis by the switching circuit of the first chassis according to the second configuration setting.

16. The configuration setting adjusting method according to claim 14, further comprising:
when the preset rule is a first preset rule,
adjusting a second initial configuration setting in the switching circuit of the second chassis to a third configuration setting by the processor according to the first preset rule, and turning on the first connector of the second chassis by the switching circuit of the second chassis according to the third configuration setting such that the second chassis is electrically connected to the second connector of the first chassis through the first connector of the second chassis; and
turning on the second connector of the second chassis by the switching circuit of the second chassis according to the third configuration setting.

17. The configuration setting adjusting method according to claim 14, further comprising:
when a second connection interface among the at least one connection interface is electrically connected to a second host and the preset rule is a second preset rule,
adjusting a second initial configuration setting in the switching circuit of the second chassis to the second configuration setting by the processor according to the second preset rule, and turning on the second connector of the second chassis by the switching circuit of the second chassis according to the second configuration setting such that the second chassis is electrically connected to the second connection interface through the second connector of the second chassis; and
turning off the first connector of the second chassis by the switching circuit of the second chassis according to the second configuration setting.

18. The configuration setting adjusting method according to claim 10, wherein the switching circuit is a PCIe (Peripheral Component Interconnect Express) switching circuit.

* * * * *